United States Patent

[11] 3,626,162

[72] Inventor John M. Rhoades
Waynesboro, Va.

[21] Appl. No. 811,003
[22] Filed Mar. 27, 1969
[45] Patented Dec. 7, 1971
[73] Assignee General Electric Company

[54] AUTOMATIC DIGITAL TIME CONSTANT SYSTEM
5 Claims, 6 Drawing Figs.

[52] U.S. Cl. .......... 235/92 DM, 235/92 R, 235/92 FQ, 235/92 FV, 235/92 T, 324/78 D
[51] Int. Cl. .......... G06m 3/14
[50] Field of Search .......... 235/92; 324/78 D, 79 D

[56] References Cited

UNITED STATES PATENTS

| | | | |
|---|---|---|---|
| 2,951,202 | 8/1960 | Gordon | 324/79 |
| 3,112,478 | 1/1963 | Ostroff | 340/347 |
| 2,925,555 | 2/1960 | Gordon | 324/78 |
| 2,951,986 | 9/1960 | Gordon | 324/79 |

*Primary Examiner*—Maynard R. Wilbur
*Assistant Examiner*—Robert F. Gnuse
*Attorneys*—Joseph B. Forman, Frank L. Neuhauser, Oscar B. Waddell, Gerald R. Woods and William S. Wolfe

ABSTRACT: A digital system for providing a smoothing effect to changes in the rate of digital information being supplied. The system includes a reversible counter and a rate multiplier. The system performs a function analogous to an RC circuit in an analog system.

INVENTOR.
JOHN M. RHOADES
BY Michael Masnik
HIS ATTORNEY

INVENTOR.
JOHN M. RHOADES
BY *Michael Masnik*
HIS ATTORNEY

| COUNT | $FF_1$ | $FF_2$ | $FF_4$ | $FF_8$ |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 0 | 0 | 0 | 0 | 0 |

FIG. 5

| COUNT | $FF_1$ | $FF_2$ | $FF_4$ | $FF_5$ |
|---|---|---|---|---|
| 0 | 0 | 0 | 0 | 0 |
| 1 | 0 | 0 | 0 | 0 |
| 2 | 0 | 1 | 0 | 0 |
| 3 | 1 | 1 | 0 | 0 |
| 4 | 0 | 0 | 1 | 0 |
| 5 | 0 | 0 | 0 | 1 |
| 6 | 1 | 0 | 0 | 1 |
| 7 | 0 | 1 | 0 | 1 |
| 8 | 1 | 1 | 0 | 1 |
| 9 | 0 | 0 | 1 | 1 |
| 0 | 0 | 0 | 0 | 0 |

FIG. 6

INVENTOR.
JOHN M. RHOADES
BY Michael Masnik
HIS ATTORNEY

AUTOMATIC DIGITAL TIME CONSTANT SYSTEM

BACKGROUND OF THE INVENTION

The present invention is a digital system for providing a time constant between input and output signals.

It is well known in analog circuitry to provide an RC circuit whenever a smooth transition is desired at an output in response to a step transition at the input. Such circuits provide a time constant, the time constant being defined as the time it would take for the output value to reach the input value if the output value continuously increased at the initial rate of increase. However, as is well known in the art, the output value increases exponentially for any time constant circuit.

An analogous type of time constant is necessary in many digital applications. For example, in most any digital application wherein the digital information controls physical movement it becomes important to insure that the digital information which controls the physical movement does not change abruptly. Specifically, for example, in a numerical control machine of the type well known in the art, the digital commands control movement of a tool along an axis of a worktable. The digital signals represent rate of movement along the axis and it is not uncommon for command rates to vary instantaneously. However, it is apparent that the rate of tool movement cannot vary instantaneously and if the control signals to the tool motor were allowed to vary instantaneously problems may arise.

SUMMARY OF THE PRESENT INVENTION

In accordance with the present invention digital apparatus provides a time constant which smoothes the transition between jumps or steps in an input signal. Both the input and output waveforms have parameters, which is defined herein as rate parameters, which control a reversible counter to count up or down depending upon the difference and the sign of said difference between the rate parameters of the input and output waveforms. A multiplier counter accumulates input pulses at a reference rate, and the stages of the multiplier counter and the reversible counter are connected to a multiply gating means which effectively multiplies the count stored in the reversible counter times the reference rate to provide an output waveform having a rate parameter equal to said count times said reference rate.

Since the system is closed looped the output rate will approach and equal the input rate. When this occurs the count value held in the reversible counter, referred to as the steady state condition of the apparatus, is equal to the ratio of the input rate and the reference rate.

BRIEF DESCRIPTION OF THE DRAWINGS

FIG. 5 illustrates the count pattern of each of the decade units of the reversible counter shown in FIG. 3.

FIG. 6 illustrates the count pattern of each of the decade units of the multiplier counter shown in FIG. 3.

DETAILED DESCRIPTION OF THE DRAWINGS

As used herein, the term rate or rate parameter refers to a parameter of an electrical waveform representing a rate value. Specifically, the parameter of the waveform may be either (a) the actual pulse repetition rate of the waveform or (b) the on duty cycle of a square waveform. The relationship between a rate parameter of an electrical waveform and its pulse repetition rate is obvious on its face. However, the same is not true for the relationship between the on duty cycle of a square waveform and the rate parameter. In order to be consistent throughout the description of the invention, the UP or POSITIVE portion of a square waveform is considered to be the ON portion of that waveform. This is consistent with the positive logic convention which is also used throughout. The on duty cycle of a square waveform is thus given in terms of percentage and is the percentage of ON time of the waveform. For example, a perfectly square wave would have a 50 percent on duty cycle whereas a waveform which is UP or POSITIVE ¾ of the time has a 75 percent on duty cycle. In many known digital systems the on duty cycle of a waveform represents rate because the waveform is effectively converted into a pulse train having a pulse repetition rate which is equal to the reference pulse repetition rate times the on duty cycle of the waveform. It will be seen by anyone of ordinary skill in the art that the square waveform can be converted directly into a pulse train having a pulse repetition rate by using the square waveform to gate the pulse train having the reference pulse repetition rate. Consequently, assuming a reference pulse repetition rate of 100 kc., a waveform having an on duty cycle of 50 percent has a rate which corresponds to 50 kc.

Figure 1:
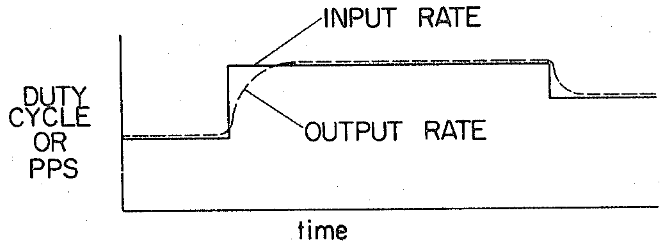
FIG. 1 is a graph illustrating the smooth change in an output signal in response to an abrupt change in an input signal as accomplished by the present invention.

Referring now to FIG. 1, there is shown a plot of time along the abscissa and duty cycle or pulses per second along the ordinate. As described above, duty cycle and pulses per second both represent rate. The solid line represents the input rate and it can be seen that the input rate changes abruptly from a low value to an intermediate value. This is shown only by way of example to illustrate how the output of the present invention creates a smooth transition in response to abrupt transitions at the input. In response to the input as illustrated by the solid line, the system of the present invention provides an output rate which is illustrated by the dashed line. It will be noted that when the input rate abruptly changes from a low value to a high value the output rate smoothly approaches the high value. The same type of transition at the output occurs when the input abruptly changes from a high value down to an intermediate value. It will be noted that the two lines shown in FIG. 1 are analogous to an input and output waveform that one would expect to see in an analog circuit containing an RC time constant. It should be kept in mind that the present invention is not merely a time delay circuit. The difference being that in a time delay circuit the output is exactly the same as the input but is delayed by a predetermined time, whereas in a time constant system the output follows the input in a manner illustrated in FIG. 1.

Figure 3:
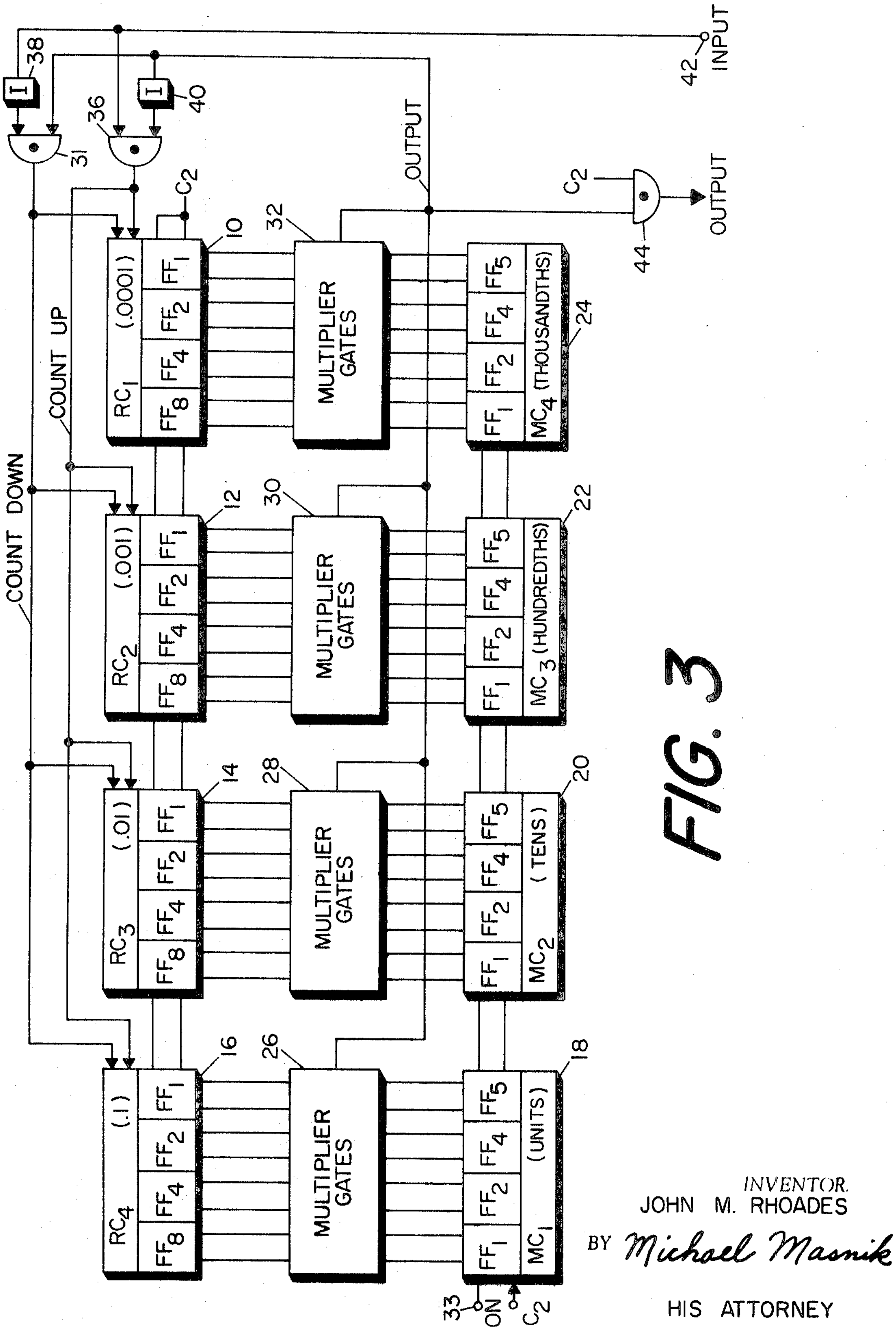
FIG. 3 is a block diagram of a preferred embodiment of the present invention.

As shown in FIG. 3 the block diagram includes a reversible counter comprising four reversible counter decade units 10, 12, 14 and 16, a multiplier counter comprising four decade units 18, 20, 22 and 24, four multiplier gates 26, 28, 30 and 32, three AND-gates 34, 36 and 44, and two INVERT-gates 38 and 40. Reversible counters which count input pulses either up or down response to command countup or command countdown input signals are well known in the art and the details thereof will not be described herein. Each decade unit of the reversible counter is wired so that the four stages therein respectively represent the counts of 1-2-4-8. Decade counters which are arranged to count in this manner are well known in the art.

Each of the decade units of the multiplier counter contains four stages which are interconnected so that the stages respectively represent the counts of 1-2-4-5. Decade counters which are arranged in this manner are also well known in the art and will not be described in any more detail herein. The count patterns, using a 1 to indicate that the stage is "on" and a 0 to indicate that the stage is "off" are illustrated in FIGS. 5 and 6 for the reversible counter decade units, and the multiplier counter decade units, respectively. Since each of the two counters comprises four decade units they have a capability of counting from 0000 to 9999. In order to understand the description of the present invention the decimal digits (0 through 9) represented in the four decade units of the reversible counter are read as if a decimal point appeared in front of the most significant digit. As an example, if the decade unit 16 contained a count value corresponding to the decimal digit 9, the decade unit 14 contains a counter value corresponding to the decimal unit 8, the decade unit 12 contains a count corresponding to the decimal unit 7, and the decade unit 10 contains a count corresponding to the decimal unit 6, the total number held in the reversible counter is read as 0.9876. Thus, the decade unit 16 represents tenths, the decade unit 14 represents hundredths, the decade unit 12 represents thousandths, and the decade unit 10 represents ten-thousandths.

The multiplier counter only counts up and recycles to the count value 0000 after reaching the count value 9,999. It will be noted that the multiplier counter decade units are arranged to count from left to right (that is the least significant digit is represented by the leftmost decade unit 18) whereas the reversible counter is arranged to count from right to left (that is the least significant digit is stored in the decade unit 10). It will be apparent to anyone of ordinary skill in the art that the above-described counting from left to right or from right to left is shown in the drawing only for the purpose of illustrating the invention and is not significant. They are illustrated that way only to indicate that each group of multiplier gates is controlled by the opposite decade units of the reversible and multiplier counters. This latter feature is significant. Thus, multiplier gates 26 are controlled by the decade counter 16 of the reversible counter, which contains the most significant digit stored in the reversible counter, and the decade unit 18 of the multiplier counter, which contains the least significant digit of the value in the multiplier counter.

Figure 2:
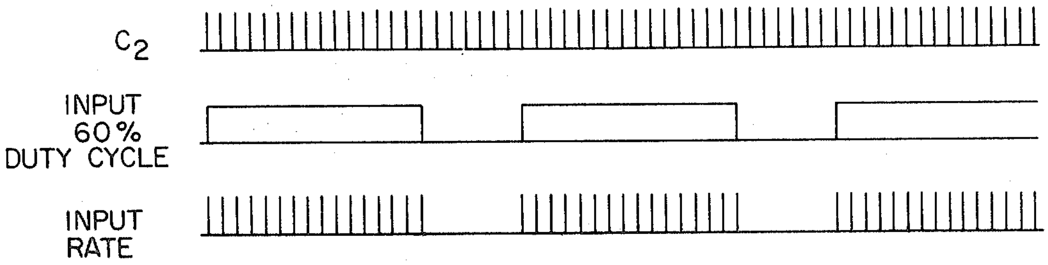
FIG. 2 illustrates waveform diagrams which are helpful in understanding the operation of the present invention.

In operation, the input waveform appears at input terminal 42 and is applied to the AND-gate 34 via an invert gate 38 and directly to the AND-gate 36. The output waveform from the multiplier gates is applied directly to AND-gate 34 and through an invert gate 40 to the AND-gate 36. A specific example of the type of waveform applied to the input terminal 42 is shown in waveform 2 of FIG. 2. It will be noted that this waveform has a 60 percent on duty cycle. Assuming that the reference pulse rate, $C_2$, is 100 kc., the input waveform represents a rate of 60 kc. As will be apparent to anyone of ordinary skill in the art, the input rate may be represented by a pulse train at a 60 kc. rate rather than a square waveform having a 60 percent on duty cycle. The reference wave train $C_2$ is illustrated in the first waveform of FIG. 2 and the third waveform labeled INPUT RATE represents the result of multiplying the reference wave train $C_2$ by the input waveform.

When AND-gate 36 is fully energized a countup command signal is applied to the reversible counter to cause that counter to begin counting up the pulses in the reference pulse train $C_2$. When AND-gate 34 is energized, a countdown command signal is applied to the reversible counter to cause the reversible counter to count down the pulses in the reference pulse train $C_2$.

The multiplier counter continuously counts the pulses in the reference wave train $C_2$ as long as it is turned on by a proper voltage at terminal 33. The operation of the invention will now be described with the assumption that the initial input rate is at 0 and abruptly changes to the rate of 60 kc. This is equivalent to the input waveform changing from a 0 percent on duty cycle to a 60 percent on duty cycle. Since initially the input and output rates will be at 0, neither AND-gate 34 nor AND-gate 36 will be energized. However, assuming that the system is turned on, the multiplier counter will be counting the reference pulse train $C_2$ which is at the rate of 100 kc. All of the decade units of the reversible counter will contain counts of 0 thereby representing a total count value in the decade counter of 0.0000. Consequently, all of the multiplier gates 26 through 32 will be disabled and the output waveform will be at 0 percent on duty cycle.

When the input rate changes to a 60 percent on duty cycle, the AND-gate 36 will initially be energized at a 60 percent duty cycle. This is so because there is no output waveform and thus the output of the invert gate 40 will be positive. The reversible counter begins counting the pulses in the reference pulse train.

As soon as the reversible counter contains a count larger than 0000 some of the stages of the reversible counter will be on, thereby enabling selected ones of the multiplier gates to pass positive voltages from the multiplier counter to the output terminal. As soon as this occurs the output voltage waveform has an on duty cycle which is greater than 0 and thus the AND-gate 36 will no longer be fully energized 60 percent of the time. This pattern continues with the reversible counter building up at a decreasing rate and the output waveform increasing its on duty cycle until such time as the on duty cycle of the output waveform is equal to the on duty cycle of the input waveform.

When the input and output rates are the same the system has reached steady state and the reversible counter will neither be counted up nor down. It should be noted that during the steady state period the input and output waveforms, although representing the same rate and having the same on duty cycle, may not be perfectly coincident and therefore in actual practice there may be some pulses counted up and some pulses counted down by the reversible counter. However, the number of pulses counted up and down will be small and will be equal so that effectively the count in the reversible counter does not change. The result of the operation described above is that in response to an abrupt change of the rate at the input, the output gradually approaches the input rate. The output waveform having the 60 percent on duty cycle, in the example described above, may be converted directly into a pulse train at a rate of 60 kc. by means of applying the output waveform to the AND-gate 44 and also applying the reference pulse train $C_2$ to the AND-gate 44.

The multiplier gates 26, 28, 30 and 32, which are shown only generally in FIG. 3, operate to multiply the reference pulse rate (100 kc.) times the count value held in the reversible counter. Thus, the count value held in the reversible counter represents the ratio of the output rate to the reference rate. Furthermore, since the output reference rate is equal to the input reference rate at steady state, the count value stored in the reversible counter represents the ratio of the input rate to the reference rate. It should be noted that the reference rate may also be varied if desirable and in one particular application the apparatus can be used to receive one rate signal at the input terminal 42 and a second rate signal at the reference terminals, $C_2$, to thereby provide a ratio between the two rates in the reversible counter.

Figure 4:
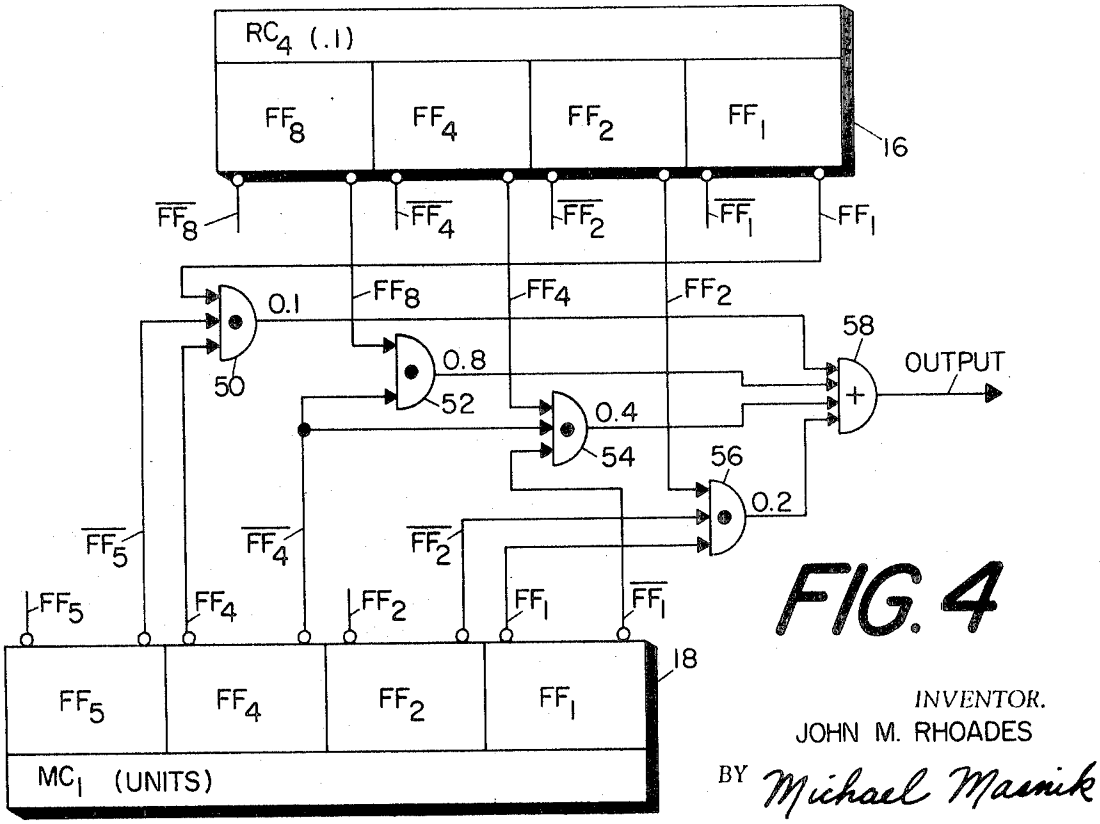
FIG. 4 is a detailed block diagram of one of the multiplier gates shown generally in FIG. 3 along with its connections to the stages of the reversible counter and the multiplier counter.

A detailed description of the manner in which the multiplier gates operate to effectively multiply the count value of the reversible counter times the reference pulse rate will be described in connection with FIG. 4. Since all of the multiplier gates 26 through 32 are identical, only multiplier gates 26 and their interaction with decade units 16 and 18 will be described in detail. As shown in FIG. 4 the multiplier gates 26 comprises four AND-gates 50 through 56 and one OR-gate 58. The output of the OR-gate 58 is connected to the output terminal of the system and the inputs to the AND-gates are derived from the four stages of the reversible decade unit 16 and the four stages of the multiply decade unit 18. It will be noted that the digital value stored in the reversible counter decade unit 16 is read in tenths and the digital value in the multiply decade unit 18 is read in units. Assume, as a first example, that the reversible counter decade unit 16 contains a count value equal to 1/10. That corresponds to $FF_1$ being on and $FF_2$ $FF_4$, and $FF_8$ being off. With $FF_1$ only in the on condition, AND-gate 50 receives a control signal from the reversible counter. AND-gate 50 also is connected to the on condition of $FF_4$ of multiply decade unit 18 and the off condition of $FF_5$ of the multiply decade unit 18.

Referring to FIG. 6, it can be seen that the decade unit of the multiplier counter contains the necessary condition to fully energize AND-gate 50 for one out of every 10 counts. Numerically, that condition occurs at a count of four. Since the decade counter 18 is constantly receiving the reference pulses at the reference rate the AND-gate 50 is fully energized for every tenth input pulse to the multiplier counter. Consequently, the output of AND-gate 50 will have a 10 percent duty cycle, or, stated in terms of rate, will represent a rate of 10,000 pulses per second. Thus, the count of 1/10 in the reversible counter provides an output signal having a rate parameter corresponding to 1/10 of the reference rate. The input connections to the AND-gates 52, 54, and 56 are also shown in detail in FIG. 4 and they provide output signals representative of rates of 80 percent, 40 percent, and 20 percent, respectively, of the reference pulse rate. The outputs of the AND-gates 50 through 56 are applied to OR gate 58 to derive a total output waveform having an on duty cycle which is determined by the count value in the reversible decade unit 16.

The multiplier gates 28, 30 and 32 operate in the same manner, the only difference being that the corresponding multiplier decade units represent counts of tens, hundreds, and thousands, respectively, rather than unit counts as is the case for the multiply decade unit 18. When the outputs of all of the multiplier gates 26 through 32, as shown in FIG. 3, are tied together the total output waveform will have a rate which is equal to the count value stored in the reversible counter times the reference pulse rate $C_2$. It will be noted that the time constant of the system is determined by the number of decades of the multiplier and reversible counters as well as the reference pulse repetition rate, and can be varied by either varying the length of the counters or varying the reference pulse repetition rate.

An additional use of the present invention, not described above, is for determining the sine or cosine of the angle of movement in a numerical control system. For example, in a numerical control system the tool may be controlled by mutually perpendicular $x$-axis and $y$-axis command signals to drive the tool at the desired direction at a desired vector rate. The $x$ -axis, $y$-axis and vector command signals will be rate signals and they can be applied to the input and reference terminals of the present invention. With the $x$ command signal applied to the input terminal and the vector command signal applied to the reference terminal, the steady state count value in the reversible counter will be the ratio of the $x$ rate to the vector rate and therefore, represents the sine of the angle of movement of the tool. By applying the $y$-axis rate signal to the input terminal and the vector rate signal to the reference terminal the steady state count value in the reversible counter will be the cosine of the angle of movement of the tool.

What is claimed as new and desired to be secured by Letters Patent of the United States is:

1. A digital time constant apparatus comprising:
  - a pulse rate multiplier counter means for counting a series of reference pulses having a reference pulse rate,
  - a reversible counter means for counting up and down in response to up and down control signals, respectively, applied thereto,
  - multiplier gate means connected to said multiplier counter means and said reversible counter means for providing an output waveform having a parameter equal to said reference rate times the count value in said reversible counter, and
  - means responsive to an input waveform and said output waveform for generating said up and down control signals, said means including first gating means responsive to an on portion of said input waveform and an off portion of said output waveform for generating said up control signal and second gating means responsive to an off portion of said input waveform and an on portion of said output waveform for generating said down control signal.

2. A digital time constant apparatus as claimed in claim 1 wherein said reversible counter means comprises $n$ series connected reversible decade counters and wherein said multiplier counter means comprises $n$ series connected decade counters.

3. A digital time constant apparatus as claimed in claim 2 wherein said multiplier gate means comprises $n$ multiplier gating units, each of said gating units being connected to one of said reversible decade counters and one of said multiplier counters in accordance with the following interconnection pattern:
  - gating unit one interconnects reversible decade counter 1 with multiplier decade counter $n$; gating unit two interconnects reversible decade counter 2 with multiplier decade counter $n$–1; gating unit three interconnects reversible decade counter 3 with multiplier decade counter $n$–2; etc.

4. A digital time constant apparatus as claimed in claim 3 wherein said parameter of said output waveform is the on duty cycle of said waveform.

5. A system for determining the ratio of two input electrical waveforms having a parameter proportional to rate information comprising:
  - first counting means, responsive to said first electrical waveform for counting at a rate equal to the rate information of said first electrical waveform,
  - a reversible counter means for counting up and down in response to command up and command down signals, respectively, applied thereto,
  - gating means connected to said first counting means and said reversible counter means for generating an output waveform having a parameter equal to the count in said reversible counting means times the rate at which said first counting means counts, and
  - means responsive to said second input electrical waveform and said output waveform for generating said command up and command down signals, said means including first gating means responsive to an on portion of said input waveform and an off portion of said output waveform for generating said up control signal and second gating means responsive to an off portion of said input waveform and an on portion of said output waveform for generating said down control signal.

* * * * *